(12) United States Patent
Manepalli et al.

(10) Patent No.: US 9,409,185 B2
(45) Date of Patent: Aug. 9, 2016

(54) SYSTEMS AND METHODS FOR RECOVERY OF RARE-EARTH CONSTITUENTS FROM ENVIRONMENTAL BARRIER COATINGS

(71) Applicant: General Electric Company, Schenectady, NY (US)

(72) Inventors: Satya Kishore Manepalli, Bangalore (IN); Theodore Robert Grossman, Cincinnati, OH (US); Don Mark Lipkin, Niskayuna, NY (US); Karthick Vilapakkam Gourishankar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 166 days.

(21) Appl. No.: 14/255,650

(22) Filed: Apr. 17, 2014

(65) Prior Publication Data

US 2015/0298137 A1 Oct. 22, 2015

(51) Int. Cl.
| | |
|---|---|
| *B03C 1/00* | (2006.01) |
| *B03C 1/02* | (2006.01) |
| *B02C 23/10* | (2006.01) |
| *B03C 1/28* | (2006.01) |
| *B03C 1/30* | (2006.01) |

(52) U.S. Cl.
CPC . *B03C 1/02* (2013.01); *B02C 23/10* (2013.01); *B03C 1/28* (2013.01); *B03C 1/30* (2013.01)

(58) Field of Classification Search
CPC ............. B03C 1/02; B03C 1/28; B03C 1/30; B02C 23/08; B02C 23/10; B02C 23/20

USPC .......................................... 209/212, 214, 228
See application file for complete search history.

(56) References Cited

U.S. PATENT DOCUMENTS

| | | | |
|---|---|---|---|
| 3,054,655 A | 9/1962 | Pawel et al. | |
| 3,078,142 A | 2/1963 | Jozef et al. | |
| 3,102,783 A | 9/1963 | Leon et al. | |
| 3,110,556 A | 11/1963 | Peppard et al. | |
| 3,296,569 A * | 1/1967 | Ikegami ................. | H01J 49/46 250/298 |
| 3,615,171 A | 10/1971 | Mason et al. | |

(Continued)

FOREIGN PATENT DOCUMENTS

| | | |
|---|---|---|
| CN | 102399999 A | 4/2012 |
| CN | 102660688 A | 9/2012 |

(Continued)

OTHER PUBLICATIONS

European Search Report and Opinion issued in connection with corresponding EP Application No. 15163251.0 on Sep. 23, 2015.

(Continued)

*Primary Examiner* — Terrell Matthews
(74) *Attorney, Agent, or Firm* — John P. Darling

(57) ABSTRACT

Systems and methods for recovery of rare-earth constituents from environmental barrier coatings (EBCs) are provided. One method includes for separating rare-earth (RE) containing constituents from a particulate feedstock containing a mixture of RE silicates and non-magnetic constituents includes disposing a collection member in a vicinity of the feedstock and magnetizing the collection member to generate a magnetic field sufficient to selectively attract the RE silicates to the collection member. The method further includes removing the RE silicates from the collection member.

18 Claims, 6 Drawing Sheets

(56) References Cited

U.S. PATENT DOCUMENTS

| | | | |
|---|---|---|---|
| 3,647,361 A | 3/1972 | Coltrinari et al. | |
| 4,032,471 A | 6/1977 | Luckey | |
| 5,035,365 A | 7/1991 | Birmingham | |
| 5,127,586 A | 7/1992 | Oder | |
| 5,176,260 A | 1/1993 | Oder | |
| 5,193,687 A * | 3/1993 | Martinez | B03C 1/30 209/40 |
| 5,368,736 A | 11/1994 | Horwitz et al. | |
| 5,512,256 A | 4/1996 | Bray et al. | |
| 5,643,474 A | 7/1997 | Sangeeta | |
| 6,146,692 A | 11/2000 | Sangeeta et al. | |
| 6,267,902 B1 | 7/2001 | Cartier et al. | |
| 6,974,563 B2 | 12/2005 | Sylvester | |
| 7,517,508 B2 | 4/2009 | Bray | |
| 7,544,112 B1 | 6/2009 | Miller et al. | |
| 7,572,418 B2 | 8/2009 | Horta et al. | |
| 7,618,601 B2 | 11/2009 | Rodrigues et al. | |
| 7,867,575 B2 | 1/2011 | Boutwell et al. | |
| 7,910,172 B2 | 3/2011 | Meschter et al. | |
| 8,039,113 B2 | 10/2011 | Kirby et al. | |
| 8,137,645 B2 | 3/2012 | Porob et al. | |
| 8,273,470 B2 | 9/2012 | Kirby et al. | |
| 8,343,589 B2 | 1/2013 | Kirby et al. | |
| 2004/0005272 A1 | 1/2004 | Sylvester et al. | |
| 2006/0105170 A1 | 5/2006 | Dobson et al. | |
| 2009/0162561 A1 | 6/2009 | Kirby et al. | |
| 2010/0062673 A1 | 3/2010 | Tedjar et al. | |
| 2011/0203281 A1 | 8/2011 | Sarrafi-Nour et al. | |
| 2014/0011038 A1 | 1/2014 | Das et al. | |
| 2014/0166788 A1 * | 6/2014 | Pearse | C22B 3/22 241/20 |

FOREIGN PATENT DOCUMENTS

| | | |
|---|---|---|
| EP | 116483 A1 | 8/1984 |
| JP | 2012017486 A | 1/2012 |
| RU | 2147623 C1 | 4/2000 |
| WO | 2013011901 A1 | 1/2013 |
| WO | 2013044376 A1 | 4/2013 |

OTHER PUBLICATIONS

Worl et al., "Magnetic Separation for Rare Earth Oxide Recovery at Sillamä, Estonia", Turning a Problem into a Resource: Remediation and Waste Management at the Sillamäe Site, Estonia NATO Science Series, vol. 28, pp. 229-236, 2000.

Bünzli et al., "Recycling of Rare Earths from Scrap", Handbook on the Physics and Chemistry of Rare Earths: Including Actinides, Chapter 255.

* cited by examiner

SYSTEMS AND METHODS FOR RECOVERY OF RARE-EARTH CONSTITUENTS FROM ENVIRONMENTAL BARRIER COATINGS

BACKGROUND

Silicon-containing materials, such as, for example, monolithic ceramics, alloys, intermetallics, and composites thereof have desirable properties for use in structures designed for service at high temperatures in such applications as aeronautical and industrial gas turbine engines, heat exchangers, and internal combustion engines. Environmental barrier coatings (EBCs) are applied to silicon-containing materials to protect the materials from harmful exposure to chemical environments and excessive thermal loads. Thus, EBCs are designed to be thermochemically stable in high-temperature, water vapor-containing environments and minimize interconnected porosity and vertical cracks which provide exposure paths between the material surface and the environment.

EBCs can be single-layer or multi-layer systems, with each layer serving at least one function, such as to provide a thermal barrier, mitigate substrate oxidation or volatilization, or prevent chemical reaction with adjacent layers or the substrate. In many EBC systems, at least one layer is substantially formed from a RE silicate, where the RE includes one or more of the elements Yttrium (Y), Ytterbium (Yb), Holmium (Ho), Erbium (Er), Thulium (Tm), and Lutetium (Lu). The RE silicates can be, for example, RE monosilicates ($RE_2SiO_5$) and RE disilicates ($RE_2Si_2O_7$). RE silicates have relatively low rates of silica volatilization in combustion atmospheres, low thermal conductivity and excellent thermomechanical and thermochemical compatibility with the above mentioned silicon-containing substrates.

EBC materials can be deposited onto components using a range of coating processes, including thermal spraying (e.g., combustion or plasma spraying), slurry-based deposition (e.g., slurry spraying, dipping, electrophoretic deposition), chemical vapor deposition, and physical vapor deposition.

During fabrication or application of the EBC, a large amount of the RE containing silicates is lost as manufacturing scrap. For example, for thermally sprayed EBC layers, as much as 90% of the feedstock powder can be lost to overspray, non-sticking particles, or deposited onto tooling fixtures. Collection of this scrap typically results in co-mingling of the high-value, RE-containing constituents with other, low-value constituents or contaminants. These low-value constituents or contaminants can include, for example, elemental silicon (Si) and silicates of Barium (Ba), Strontium (Sr), and Aluminum (Al) (e.g., such as found in barium-strontium-aluminosilicate (BSAS)).

A similar problem arises with in-factory scrapped/reworked and end-of-use EBC-coated components. The coatings can be stripped from these components by processes such as chemical stripping or abrasive grit blasting. For example, if abrasive grit blasting is used to strip the coatings, the resulting feedstock is a comingled mixture of the abrasive medium, RE silicates, silicates containing Ba/Sr/Al, elemental Si, silicon dioxide, and other intentional additions and/or impurities resulting from engine operation or the stripping process.

Therefore, it is desirable to efficiently separate high-value RE-containing constituents from low-value constituents and contaminants in EBC overspray powders, EBC slurry deposition powders, and stripped EBC coatings.

BRIEF DESCRIPTION

In one embodiment, a method for separating rare-earth (RE) containing constituents from a particulate feedstock containing a mixture of RE silicates and non-magnetic constituents is provided. The method includes disposing a collection member in a vicinity of the feedstock, and magnetizing the collection member to generate a magnetic field sufficient to selectively attract the magnetic RE silicates to the collection member. The method further includes removing the RE silicates from the collection member.

In another embodiment, a system is provided to perform the method described above.

DETAILED DESCRIPTION

Figure 1:
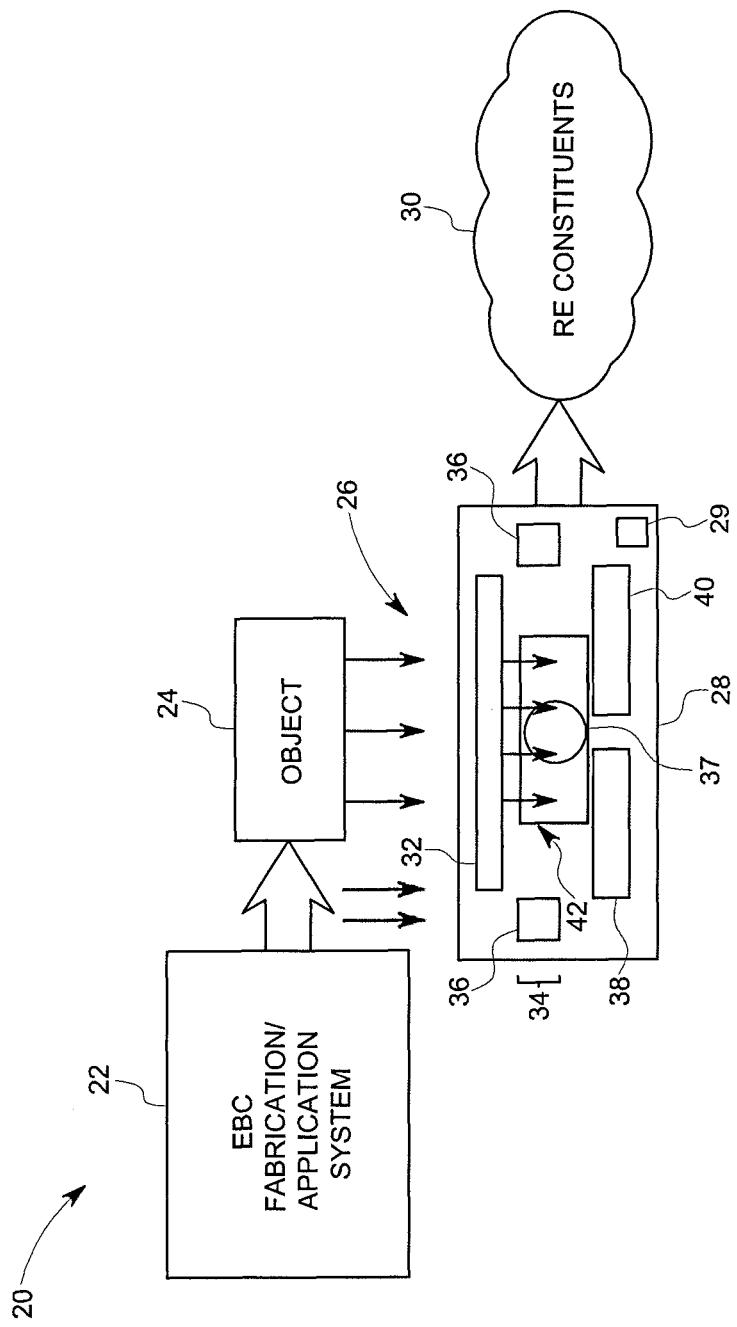
FIG. 1 is a block diagram of a system for collection and recovery of rare-earth (RE) containing constituents from an environmental barrier coating (EBC) feedstock in accordance with various embodiments.

Various embodiments will be better understood when read in conjunction with the appended drawings. To the extent that the figures illustrate diagrams of the functional or operational blocks of various embodiments, the functional blocks are not necessarily indicative of the division between components or steps. Thus, for example, one or more of the functional blocks may be implemented in a single component or process, or multiple components or processes. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide a magnetic separation process to separate rare-earth (RE) containing constituents from low-value constituents and/or impurities, so as to recover a high-purity, RE-containing product that can subsequently be returned into high-value use. For example, various embodiments provide for extracting RE-containing constituents from a feedstock containing RE silicates having strongly paramagnetic RE ions and non-magnetic low-value constituents or contaminants. In various embodiments, as used herein, the term "non-magnetic" includes both diamagnetic and weakly paramagnetic.

The separation process in some embodiments allows for the separation of Yttrium (Y) and Ytterbium (Yb) from a feedstock containing Barium (Ba), Strontium (Sr), Aluminum (Al), and Silicon (Si). However, it should be appreciated that in various embodiments, the EBC may contain other combinations, as well as different amounts and/or ranges of non-magnetic constituents and/or contaminants, including organics and metals.

By practicing at least one embodiment described herein, the efficient upgrading or recovery of high-value RE-containing constituents from EBC scrap collected during the application process and coating stripping may be provided. In some embodiments, a magnetic-based process is provided to separate the high-value RE-containing constituents from low-value constituents or contaminants so as to recover a stream of RE-containing species having reduced contaminants and that can subsequently be recycled and returned into high-value use. The separation process in one embodiment includes the separation of Ytterbium-Yttrium containing constituents of EBCs from contaminants containing Ba, Sr, Al, and Si. However, different RE-containing feedstock compositions may be processed and additional or different constituents containing additional or different elements may be removed.

FIG. 1 is a block diagram of a system 20 in accordance with various embodiments that allows for the collection and recovery of RE-containing constituents, such as resulting from an EBC application process. In particular, an EBC fabrication/application system 22 provides for fabricating and/or applying an EBC to an object 24. For example, the object 24 may be a silicon-bearing material with the EBC fabrication/application system 22 applying an EBC thereto as known in the art, such as using a plasma spraying process. However, any method in the art may be used to apply the EBC to the object, for example, thermal spraying (e.g., combustion or plasma spraying), slurry-based deposition (e.g., slurry spraying, dipping, electrophoretic deposition), chemical vapor deposition and physical vapor deposition. Additionally, the object 24 may be any object and is not limited to an object formed from a silicon-bearing material. The object may be, for example, a gas turbine component. In some embodiments, and as another example, the object 24 may be an object formed from a ceramic matrix composite (CMC) substrate material, for example, for use in aeronautical and industrial gas turbine engines, heat exchangers, and internal combustion engines.

Additionally, the EBC applied to the object 24 by the EBC fabrication/application system 22 may be any type of RE-containing EBC. In some embodiments, the feedstock may contain Ytterbium (Yb) in the form of at least one of $RE_2Si_2O_7$ (REDS) or $RE_2SiO_5$ (REMS). In one embodiment, the EBC comprises the following constituents (illustrating the constituents of one or more exemplary embodiments): $(Y,Yb)_2Si_2O_7$ (YbYDS), $Y_2SiO_5$ (YMS), $(Ba,Sr)Si_2Al_2O_8$ (BSAS), Si. However, it should be appreciated that other compounds or compositions may form part of the EBC or the input feedstock for recycling. For example, the feedstock may include constituents such as but not limited to $SiO_2$, $Al_2O_3$, $Fe_2O_3$, $Fe_3O_4$, $Y_2O_3$-stabilized $ZrO_2$, (Ni,Co)CrAlY, and organic compounds. For example, the EBC may be a EBC/TBC as described in U.S. Pat. No. 7,867,575. As another example, a component having an EBC may be formed as described in U.S. Pat. No. 7,910,172. Other examples are described in U.S. Pat. Nos. 8,343,589, 8,273,470, 8,039,113.

It should be noted that when reference is made herein to at least one of "A" or "B" this means at least one of A, or at least one of B, or at least one of A and at least one of B. For example, at least one of Y or Yb includes: Y, Yb, or Y and Yb. In some embodiments, the feedstock is a non-deposited feedstock powder including at least one of REDS or REMS and at least one of $(Ba,Sr)Si_2Al_2O_8$ (BSAS) or Si, and wherein at least the Si and BSAS are substantially removed from the non-deposited feedstock powder, affecting an upgrade of the RE-containing feedstock. In some embodiments, the feedstock comprises a REDS wherein the RE comprises a mixture of Yttrium (Y) and Ytterbium (Yb) in the form of YbYDS, and the YbYDS is selectively extracted from the feedstock.

As illustrated in FIG. 1, when applying the EBC (or TBC) to the object 24, for example by thermally spraying EBC layers on the object 24, some of the feedstock powder does not deposit onto the surface of the object 24. Depending on the geometry of the object being coated, the process parameters and tooling/fixturing used, in excess of 90% of the feedstock powder may not deposit on the object 24. In particular, the non-deposited feedstock powder can be lost as overspray powder, bounce off the part as non-sticking particles, or deposit as a coating on tooling fixtures, as illustrated by the arrows 26. In these processes, the RE-containing feedstock powder becomes mixed with contaminants as well as with other components of the coating, such as elemental silicon (Si) and/or silicates of Barium (Ba), Strontium (Sr), and Aluminum (Al).

In various embodiments, a collection and recovery system 28 is provided to collect and recover the non-deposited RE-containing feedstock. In particular, the collection and recovery system 28 collects the mixed non-deposited feedstock powder and contaminants and separates the RE-containing constituents 30 from the low-value constituents and contaminants. The collection and recovery system 28 in the illustrated embodiment includes a holding or storage area 32 where non-deposited feedstock powder accumulates and is held. For example, the non-deposited feedstock powder may fall into the holding or storage area 32 by gravitational forces or in some embodiments, other forces may be applied (e.g., a vacuum or suction force, such as using a cyclone, or by generating airflow from a fan, or an electrostatic force). The collected non-deposited feedstock powder is then processed as described in more detail herein to separate and recover the RE-containing constituents 30, such as in a purity and form that facilitates reuse in high-value applications, including but not limited to EBCs. In some embodiments, the non-deposited feedstock powder may be processed before being collected with the holding or storage area 32. One or more storage or collection area may be movable.

In some embodiments, a feedstock preparation step may be performed prior to the magnetic separation process described herein, such as using non-magnetic physical liberation and separation techniques. For example, in various embodiments, powder or coating collected in the collection and recovery system 28 is comminuted, such as by milling, to decrease the particle size and/or to break up agglomerates. Additionally, some upgrading of the RE-containing constituents in the feedstock may be provided using techniques such as screening or sieving to remove large contaminants (e.g., masking materials, machining chips, or organic debris), or gravimetric separation (e.g., flotation) to remove low-density or high-density contaminants, or low-field magnetic separation to remove ferromagnetic contaminants.

In operation, in various embodiments, the collection and recovery system 28 is used to perform a magnetic separation of RE-containing constituents from the feedstock, such as the non-deposited EBC feedstock powder. For example, in one embodiment, the collection and recovery system 28 provides for separation of YbYDS from the rest of the feedstock. The YbYDS may first be dispersed in a medium (e.g., such as water or alcohol with standard dispersants). Thus, YbYDS may be separated from an EBC feedstock containing a mixture of YbYDS and non-magnetic constituents. It should be noted that in some embodiments, instead of a wet separation process, a dry separation process may be used.

The collection and recovery system 28 may use generated magnetic fields when separating the REs from the contaminants. For example, the collection and recovery system 28 may use magnetic separation in which the magnetically susceptible or attracted material, such as YbYDS, is separated from a feedstock (dispersed in a medium or in the dry state) using a magnetic force. The magnetically non-susceptible material, which in this embodiment can comprise low-value EBC constituents and/or contaminants, remain in the medium and are thus separated from the YbYDS. For example, in some embodiments described herein, YMS, BSAS, and/or Si are removed from the YbYDS. Thus, in various embodiments, a physical separation of the high-value RE-containing constituents is achieved.

In particular, in the illustrated embodiment, the collection and recovery system 28 includes a magnetic field generator 34 that is configured to generate a magnetic field for use in separation of the RE-containing constituents from the feedstock. For example, the magnetic field generator 34 may be a magnetic separator as known in the art, such as a high intensity magnetic separator. In some embodiments, the magnetic field generator 34 operates to generate a magnetic field in the range of about 0.1 Tesla (T) to about 5 T. For example, in one embodiment, a magnetic field of about 1.4 T is applied to the non-deposited feedstock powder, which may be dispersed in a medium, such as water or isopropanol (available from Dow Chemical Company), with one or more dispersants, such as Darvan (available from Vanderbilt Minerals) by the magnetic field generator 34. However, it should be appreciated that other media, dispersants, and magnetic field strengths may be used as desired or needed.

The magnetic field generator 34 also may include one or more electromagnets 36 (e.g., sets of coils that are energized), which are used to perform magnetic separation on the feedstock powder as described in more detail herein. For example, the magnetic field generator 34 generates a magnetic field that attracts the paramagnetic RE-containing constituents to a collection member, leaving the non-magnetic materials behind. It should be noted that although the magnetic field generator 34 includes an electromagnet 36, permanent magnets may be used. Permanent magnets may be especially useful in separating ferromagnetic constituents/contaminants from the feedstock.

In operation, the non-deposited feedstock powder is first collected in the holding or storage area 32 (which may include dispersion as described herein) and then separation is performed using the magnetic field generator 34. In some embodiments, multiple magnetic field generators 34 may be provided to perform magnetic separation as described herein.

The collection and recovery system 28 also includes one or more RE collection areas 38 (one is shown) for collection of separated RE-containing constituents. In one embodiment, the electromagnet 36 creates a magnetic field that magnetizes a collection member 37, such as a steel ring (when current flows through the coils forming the electromagnet 36) that may be placed in the holding or storage area 32 or a separate container, illustrated in this embodiment as a chamber 42 (e.g., a vessel through which liquids may be passed as described herein). However, it should be noted that other shapes and configurations of collection members 37 may be used instead of or in addition to rings. For example, in one embodiment, the collection member 37 may be steel wool positioned within the chamber 42.

When one or more of the electromagnets 36 are energized by the magnetic field generator 34, the more strongly paramagnetic constituents of the dispersed feedstock powder are attracted to the collection member 37. The collection member 37 may be dispensed inside the chamber 42. While the RE-containing constituents are attracted to and held on the collection member 37, the non-magnetic constituents remain in the medium. These low-value constituents may be removed by, for example, draining the medium into the contaminant collection area 40. The draining step may further include rinsing the ring while one or more of the electromagnets 36 are energized. Thereafter, the RE-containing constituents may be collected, for example, by de-energizing the electromagnet 36, which causes the RE-containing constituents to release from the collection member 37 into, for example, the RE collection area 38. The releasing step may further include a rinsing step using, for example, water or alcohol. RE-containing constituents collected at the collection area 38 may be separated from the liquid medium by means of filtration.

It should be noted that configuration of the RE collection area 38 and the contaminant collection area 40 may be varied, such as based on the particular application or the total and relative amounts of RE-containing constituents to be collected. Thus, after separation, the RE-containing constituents and contaminants may be maintained in different storage areas for subsequent reuse and disposal, respectively.

It also should be noted that different mechanisms may be provided to facilitate the transfer of the RE-containing constituents to the RE collection area 38 and the contaminants to the contaminant collection area 40. For example, different conduits may be provided to direct or control the flow of the RE-containing constituents and the contaminants into the RE collection area 38 and the contaminant collection area 40, respectively. However, it should be noted that any suitable transfer mechanisms may be used, which may include transfer tubes or other transport devices.

Additionally, the RE collection area 38 and the contaminant collection area 40 may be configured for movable operation. For example, the RE collection area 38 and the contaminant collection area 40 may comprise movable members (e.g., wheels, rollers, conveyor belts, or rails) that allow movement of the RE collection area 38 and the contaminant collection area 40 with respect to the magnetic field generated by the magnetic field generator 34. For example, when the magnetic field generator 34 is energized, the contaminant collection area 40 may be positioned in proximity to the magnetic field generator 34 to collect the feedstock constituents that are not attracted to the collection member 37 and/or rinsed from the collection member 37. Thereafter, the contaminant collection area 40 may be moved and the RE collection area 38 positioned in proximity to collect the RE-containing constituents. When the electromagnets 36 are de-energized, the RE-containing constituents are released (before or after an optional rinsing step) and collected by the RE collection area 38. Thus, the RE collection area 38 and the contaminant collection area 40 may be selectively and independently moved in and out of collection positions.

Although the preceding embodiments have described feedstock dispersion in a liquid medium, dry separation may be provided. In an example of dry separation, applying the magnetic field to the passing feedstock, such as along a conveyor system, moves RE-containing constituents from the conveyor by the magnetic field into the RE collection area 38 while the non-magnetic constituents remain on the conveyor and are collected in the contaminant collection area 40. Furthermore, although the preceding embodiments have described single-pass separation, multiple iterations of the above process steps can be readily implemented in order to increase the separation fidelity (i.e., reduce the amount of RE-containing constituent slip into the contaminant stream and contaminants into the RE collection stream). Thus, either the contents of the RE collection area 38, the contaminant collection area 40, or both, can be re-dispersed and cycled through the magnetic separation process steps as described above.

It should be noted that other variations are contemplated. For example, in some embodiments, elements may be intentionally added to the RE-containing constituents so as to facilitate magnetic separation. In one embodiment, an iron oxide may be added to the RE disilicate to allow separation at lower magnetic field strengths. In another embodiment, Yb may be added to YMS to allow magnetic separation of the latter.

Figure 2:
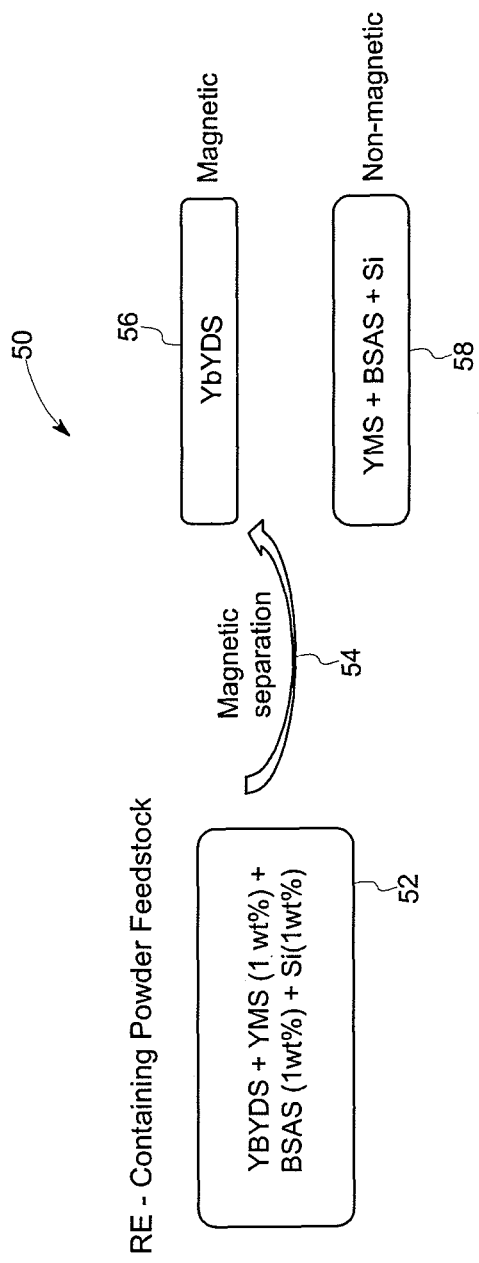
FIG. 2 is a flow diagram illustrating magnetic separation of RE-containing constituents from an EBC feedstock in accordance with various embodiments.

Various embodiments provide a separation and recovery method such as illustrated in FIG. 2 for the magnetic separation of RE-containing constituents from particulate feedstocks, which in some embodiments is the separation of YbYDS from EBC feedstock. However, it should be appreciated that other REs may be separated and recovered and FIG. 2 is illustrative of one type of magnetic separation process that may be performed. In particular, the process 50 includes collecting over-spray powder 52 as described herein. The over-spray powder 52 includes RE-containing constituents, low-value constituents and contaminants. In the illustrated embodiment, the process 50 magnetically separates YbYDS from an EBC feedstock powder comprising $(Y,Yb)_2Si_2O_7$ (YbYDS), $Y_2SiO_5$ (YMS), $(Ba,Sr)Si_2Al_2O_8$ (BSAS), Si and other minor organic and inorganic impurities.

In particular, the process 50 includes generating and applying a magnetic field that separates the RE-containing constituents, in this case YbYDS, from the over-spray powder 52. As described herein, the RE-containing constituents are attracted to and collect on the surface of the collection member 37 (shown in FIG. 1). The magnetic separation at 54 results from the attraction of the strongly paramagnetic species (in this case $Yb^{3+}$ in YbYDS) to the collection member 37 as described herein.

The disclosed process allows for the magnetic separation of the RE-containing constituents from the low-value feedstock constituents and contaminants. In particular, the strongly paramagnetic RE-containing constituents are attracted to the collection member 37 when the magnetic field is externally applied, whereas the non-magnetic constituents (e.g., low-value constituents and/or contaminants) are not attracted to the collection member 37 (it should be noted that, while non-magnetic and weakly paramagnetic particles are not attracted to the collection member 37, diamagnetic particles are repelled from the collection member 37). In some embodiments, YbYDS is separated from a mixed feedstock dispersed in water or alcohol using a 0.5 T-5 T magnetic field.

Figure 3:
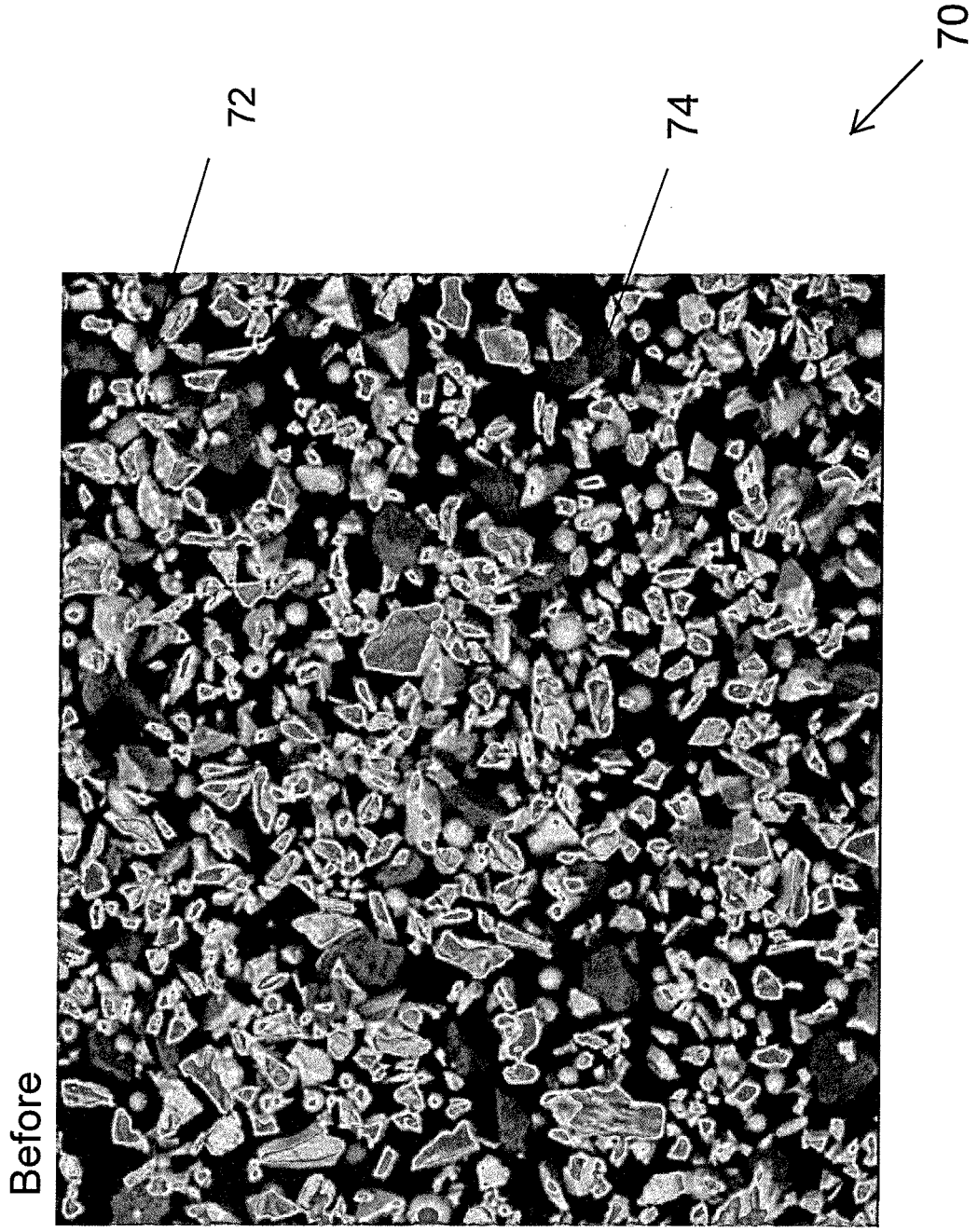
FIG. 3 is a scanning electron microscope (SEM) image of a RE silicate containing EBC feedstock containing non-RE constituents and contaminants.
Figure 4:
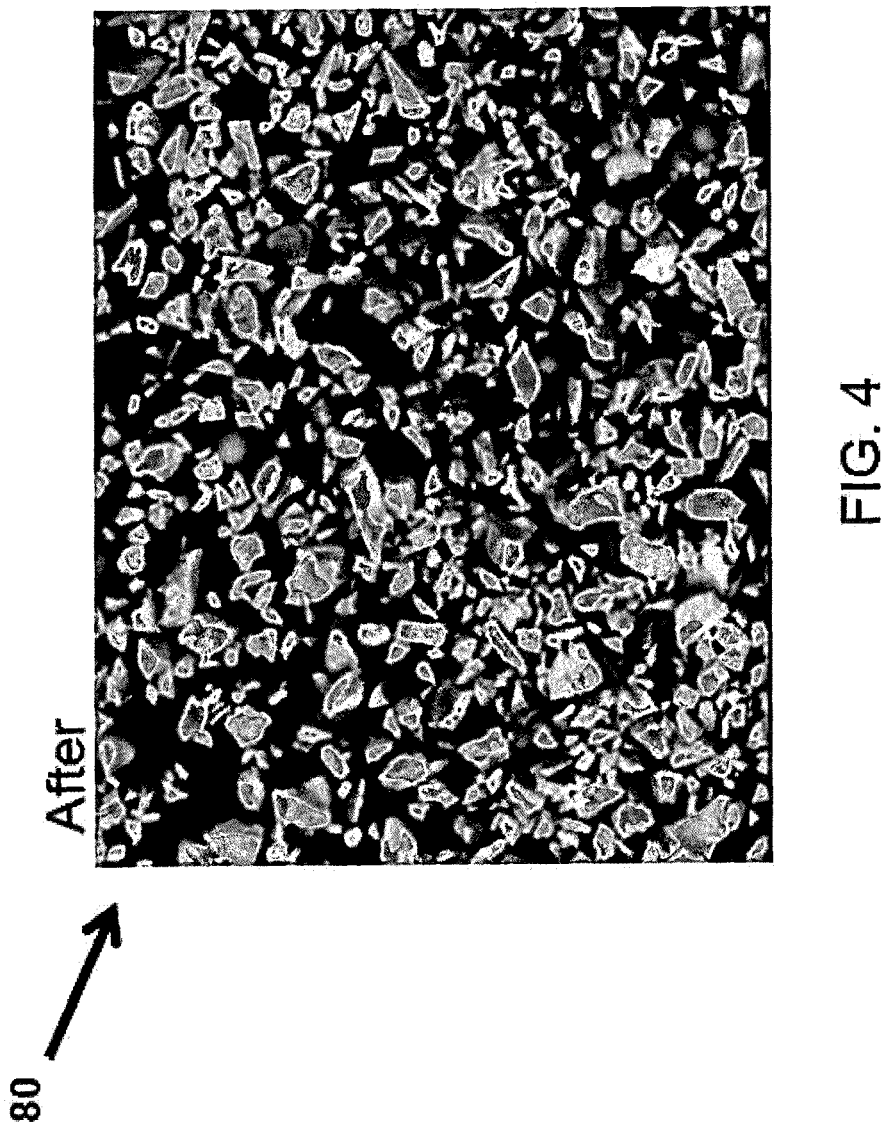
FIG. 4 is a scanning electron microscope (SEM) image of the EBC feedstock of FIG. 3 after performing magnetic separation in accordance with various embodiments.

For example, the image 70 of FIG. 3 shows an EBC feedstock comprising $(Y,Yb)_2Si_2O_7$ (YbYDS), $Y_2SiO_5$ (YMS 76), $(Ba,Sr)Si_2Al_2O_8$ (BSAS 72), Si 74 and other minor organic and inorganic impurities. As described herein, the RE-containing constituents are separated from the low-value constituents/impurities in the EBC feedstock powder. For example, FIG. 4 is an image 80 of the same EBC feedstock as shown in the image 70 of FIG. 3 after performing magnetic separation as described herein. In this example, a 5 g batch size was used containing a mixture of YbYDS, YMS, BSAS, and Si, which were dispersed in isopropanol with a few drops of Darvan. A 1.4 T NdFeB magnet was placed in the mixture and powder attracted to the magnet was collected by rinsing with acetone. The separation process was repeated three times. As can be seen, the BSAS 72 and Si 74 particles identified in the image 70 have been substantially removed. The magnetic separation thus resulted in a substantially pure YbYDS.

Figure 5:
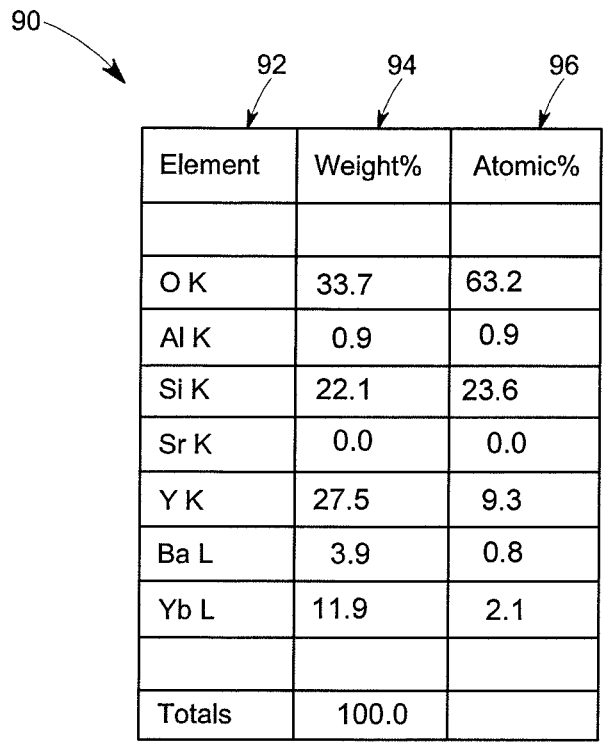
FIGS. 5 and 6 are tabulated results from energy-dispersive x-ray spectroscopy (EDX) showing the feedstock composition before and after the magnetic separation process performed on the EBC feedstock illustrated in FIGS. 3 and 4.
Figure 6:
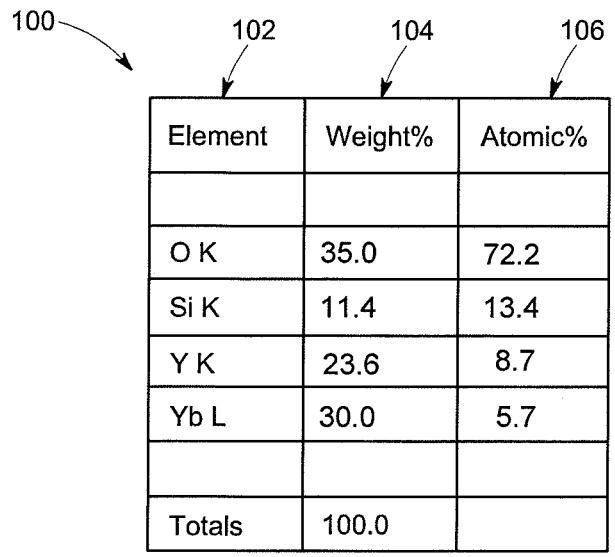

The results of chemical analyses (calculated from energy-dispersive x-ray spectroscopy (EDX)) of samples from the above example and corresponding to the images 70 and 80 are shown in Tables 90 and 100 of FIGS. 5 and 6. These tables list the composition of the input feedstock (before magnetic separation) and the output product (after magnetic separation), respectively. In each of the tables 90 and 100, the first column 92, 102 identifies the element, the second column 94, 104 identifies the weight percentage of the element, and the third column 96, 106 identifies the atomic percentage of the element.

As can be seen by comparing tables 90 and 100, the contaminants have been substantially removed using the disclosed magnetic separation process. Additionally, as can be seen, the RE elements Y and Yb remain in the atomic proportions of the starting disilicate. Thus, the non-RE containing constituents, which in this embodiment are non-magnetic (e.g., BSAS, Si, YMS), were reduced to quantities that do not affect the quality of the output product.

The various processes performed herein may be controlled manually, automatically, or by a combination thereof. For example, in one embodiment, the collection and recovery system 28 may include a controller 29 that controls the steps of various embodiments described herein. For example, the controller 29 may control the duration of time for processing in the steps of various embodiments. In some embodiments, user intervention or input may be provided.

Figure 7:
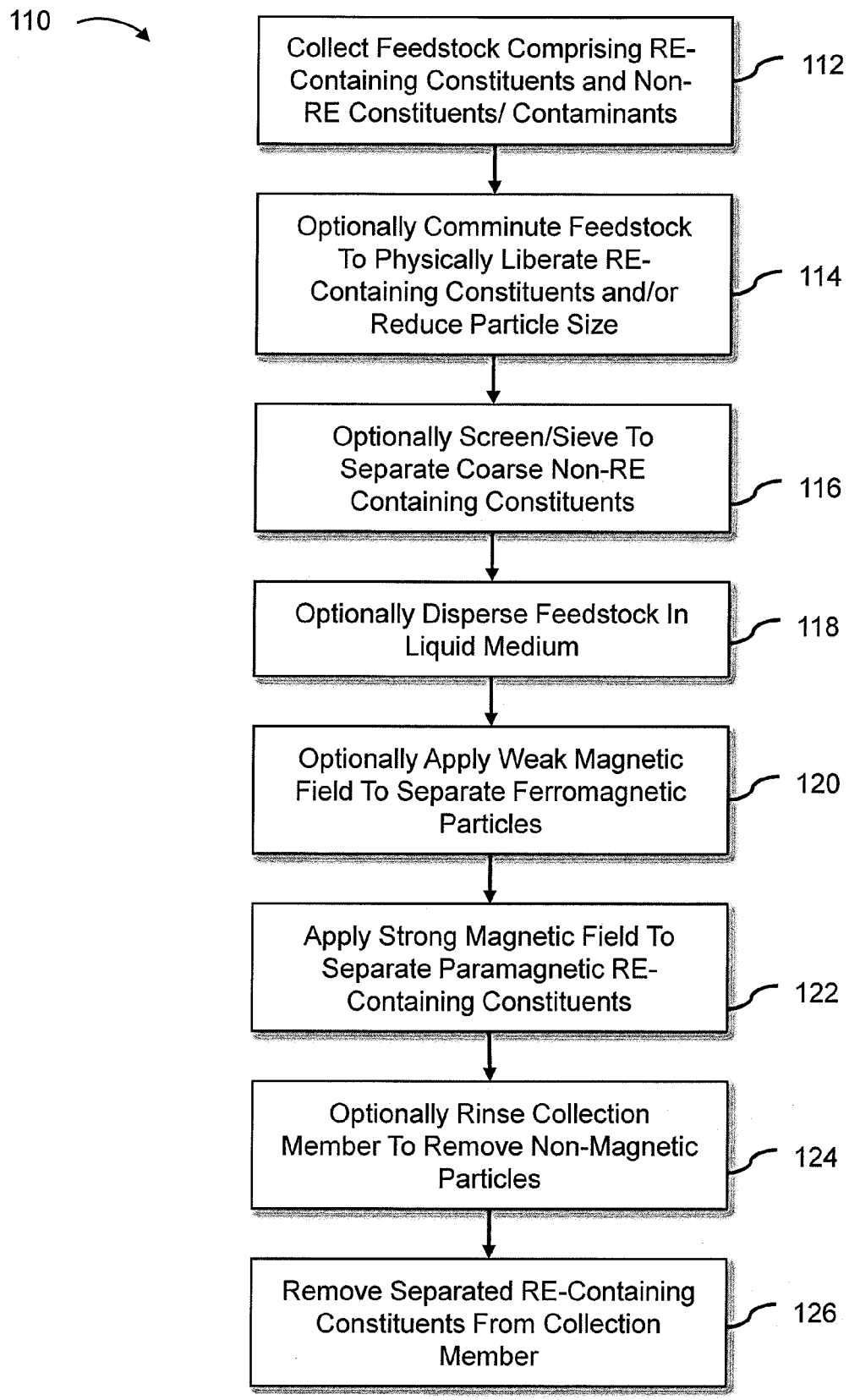
FIG. 7 is a flowchart of a method for performing magnetic separation of RE containing constituents from EBC feedstock in accordance with an embodiment.

Various embodiments also provide a method 110 as shown in FIG. 7 that may employ structures or aspects of different embodiments discussed, such as may be performed by the collection and recovery system 28 (shown in FIG. 1). In various embodiments, certain steps may be omitted or added, certain steps may be combined, certain steps may be performed simultaneously, or concurrently, certain steps may be split into multiple steps, certain steps may be performed in a different order, or certain steps or series of steps may be re-performed in an iterative fashion.

In particular, the method 110 includes collecting the RE-containing feedstock at 112, wherein the feedstock comprises RE constituents and non-RE constituents/contaminants. For example, deposited EBCs and un-deposited EBC feedstock powder may be collected at 112 as described in more detail herein. In some embodiments, the REs are Y and Yb and the low-value constituents comprise BSAS and Si. However, other REs or low-value constituents/contaminants may alternatively or additionally be present in the EBC, such as based on the particular application for the EBC.

The method 110 also optionally includes comminuting the feedstock at 114 to physically liberate the RE-containing constituents and/or reduce particle size. The method 110 further optionally includes at 116 screening or sieving the feedstock to separate therefrom coarse agglomerates and non-RE containing constituents.

The method 110 includes optionally dispersing the feedstock in a liquid medium at 118. For example, the feedstock may be dispersed in a medium such as water or alcohol with standard dispersants as described herein. It should be noted that the feedstock may be manually, semi-automatically, or automatically dispersed in the medium. It should be noted that in some embodiments, as described herein, a dry separation may be performed instead of a wet separation, such that the feedstock is not dispersed in a medium. For example, the feedstock may be physically dispersed within a vacuum or other gas or air chamber (including a fluidized bed or stream) or may be separated as the feedstock is moved along a conveyor belt or similar conveyance device as described herein. The method 110 optionally includes at 120 applying a weak magnetic field (e.g., less than 0.5 T) to separate ferromagnetic particles.

The method 110 includes applying a strong magnetic field (e.g., greater than 0.5 T) at 122 to separate the paramagnetic RE-containing constituents. For example, as described herein, a magnetic field is generated that magnetizes a collection member within the medium. For example, a steel ring or steel wool may be magnetized by a 1.4 T magnetic field as described herein. The magnetization of the collection member causes the more strongly paramagnetic constituents to collect on the collection member (which may be located in proximity of or within the medium). Additionally, the non-magnetic constituents remain in the medium and are not attracted to the collection member. For example, the strongly paramagnetic constituents may be RE-containing while the non-magnetic constituents may be low-value constituents and/or contaminants.

The method 110 optionally includes rinsing the collection member to remove the non-magnetic particles. For example, the non-magnetic particles that are not attracted to the collection member may be rinsed and removed.

After the RE-containing constituents are collected on the collection member 37, the method 110 includes at 126 removing the separated RE-containing constituents from the collection member. For example, the collection member may be removed from the medium (e.g., physically removed from the liquid) or the medium removed from the collection member (e.g., liquid in which the collection member is located is drained). As a result, the low-value constituents/contaminants are removed from the RE-containing constituents. It should be noted that some of the medium or contaminants may still remain after an initial removal, and a subsequent removal may be performed (e.g., by rinsing the collection member at 124 and/or repeating the dispersion and magnetic separation process cycle).

Additionally, one or more of steps 118, 120, 122, 124, and 126 may be repeated. For example, some of the medium or contaminants may still remain after an initial removal, and a subsequent removal may be performed (e.g., by rinsing the collection member and/or repeating the dispersion and magnetic separation process cycle). The RE-containing constituents may then be reused or further recycled.

Various embodiments provide for the magnetic separation of REs from contaminants in EBCs. As described herein, the various processes are performed without changing the chemical states and/or compositions of the RE-containing constituents.

While some examples provided herein may be described in non-automated processes, these processes and methods are readily amenable to automation, such as but not limited to, dispersing, mixing, rinsing and filtering. Furthermore, while processes and methods described herein may be performed as batch processes, the processes and methods are readily amenable to continuous or semi-continuous unit operations using methods and processes known in the art.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of various embodiments, they are by no means limiting and are only example embodiments. Many other embodiments will be apparent to those of skill in the art upon reviewing the above description. The scope of the present application should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for separating rare-earth (RE) containing constituents from a particulate feedstock containing a mixture of RE silicates and non-magnetic constituents, the method comprising:
    disposing a collection member in a vicinity of the feedstock;
    magnetizing the collection member to generate a magnetic field sufficient to selectively attract the RE silicates to the collection member;
    removing the RE silicates from the collection member; and
    removing the non-magnetic constituents by rinsing the collection member while the magnetic field is applied.

2. The method of claim 1, wherein removing the RE silicates comprises stopping application of the magnetic field to the collection member, thereby causing release of the RE silicates from the collection member.

3. The method of claim 1, wherein the RE silicates have paramagnetic properties, and wherein applying the magnetic field comprises applying a magnetic field of at least 0.5 Tesla.

4. The method of claim 1, wherein the feedstock comprises an RE disilicate in the form of $RE_2Si_2O_7$ (REDS) that includes Ytterbium (Yb).

5. The method of claim 4, wherein the feedstock comprises REDS and at least one of $RE_2SiO_5$ (REDS), $(Ba,Sr)Si_2Al_2O_8$ (BSAS) or Si, and wherein separating and removing the non-magnetic contaminants comprises separating and removing at least one of the REMS, the BSAS or the Si.

6. The method of claim 1, further comprising dispersing the feedstock in a medium.

7. The method of claim 1, further comprising performing feedstock preparation prior to separation, including at least one of (i) comminuting the feedstock to decrease a particle size of the feedstock or liberate RE-containing constituents from agglomerates, (ii) screening or sieving the feedstock to remove oversized particles, (iii) performing flotation separation of the feedstock to remove low-density constituents or contaminants, (iv) performing low-field magnetic separation on the feedstock to remove ferromagnetic contaminants, and (v) dispersing the feedstock in a liquid medium.

8. The method of claim 1, wherein magnetizing the collection member comprises using at least one electromagnet to magnetize the collection member.

9. A system for collection and recovery of rare-earth (RE) containing constituents from a powder feedstock having RE-containing constituents, the system comprising:
a magnetic field generator configured to apply a magnetic field;
a magnetizable collection member disposed in a vicinity of the powder feedstock, the applied magnetic field causing the RE-containing constituents to selectively attract to the collection member to affect separation of the RE-containing constituents from the powder feedstock; and
a collection and recovery system having a conveyor system configured to move the powder feedstock, wherein the magnetic field moves RE-containing constituents from the conveyor as the powder feedstock passes through the magnetic field.

10. The system of claim 9, further comprising a collection and recovery system configured to rinse the collection member while the magnetic field is applied.

11. The system of claim 9, further comprising a collection and recovery system configured to stop application of the magnetic field to the collection member, thereby causing release of the separated RE-containing constituents from the collection member to thereby collect the RE-containing constituents.

12. The system of claim 9, wherein the RE-containing constituents have paramagnetic properties and wherein the magnetic field generator is further configured to apply a magnetic field of at least 0.5 Tesla.

13. The system of claim 9, wherein the powder feedstock comprises an RE disilicate $RE_2Si_2O_7$ (REDS) that includes Ytterbium (Yb).

14. The system of claim 9, wherein the powder feedstock comprises Yttrium (Y) and Ytterbium (Yb) in the form of YbYDS, and further comprising a collection and recovery system configured to separate the YbYDS from the remainder of the powder feedstock.

15. The system of claim 9, further comprising a collection and recovery system configured to disperse the feedstock in a medium.

16. The system of claim 9, further comprising a collection and recovery system configured to, prior to separation, one of (i) comminute the feedstock to decrease a particle size of the feedstock or liberate RE-containing constituents from agglomerates, (ii) screen or sieve the feedstock to remove oversized particles, (iii) perform flotation separation of the feedstock to remove low-density constituents or contaminants, (iv) perform low-field magnetic separation on the feedstock to remove ferromagnetic contaminants, and (v) disperse the feedstock in a liquid medium.

17. The system of claim 9, wherein the collection and recovery system is further configured to use at least one electromagnet to apply the magnetic field.

18. The system of claim 9, wherein the magnetic field generator is further configured to apply a magnetic field of less than 0.5 Tesla to separate ferromagnetic particles from the powder feedstock.

\* \* \* \* \*